US010958424B1

(12) United States Patent
Chhabra

(10) Patent No.: US 10,958,424 B1
(45) Date of Patent: Mar. 23, 2021

(54) MECHANISM TO ALLOW THIRD PARTY TO USE A SHARED SECRET BETWEEN TWO PARTIES WITHOUT REVEALING THE SECRET

(71) Applicant: Amazon Technologies, Inc., Seattle, WA (US)

(72) Inventor: Jasmeet Chhabra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 15/801,924

(22) Filed: Nov. 2, 2017

(51) Int. Cl.
*H04L 9/08* (2006.01)
*H04L 9/30* (2006.01)

(52) U.S. Cl.
CPC ............ *H04L 9/0841* (2013.01); *H04L 9/083* (2013.01); *H04L 9/3066* (2013.01)

(58) Field of Classification Search
CPC ...... H04L 9/0841; H04L 9/3066; H04L 9/083
USPC .......................................................... 713/171
See application file for complete search history.

(56) References Cited

U.S. PATENT DOCUMENTS

| | | | | |
|---|---|---|---|---|
| 6,084,969 | A * | 7/2000 | Wright | H04L 63/0464 340/7.21 |
| 6,636,968 | B1 * | 10/2003 | Rosner | H04L 9/0833 713/178 |
| 9,397,835 | B1 * | 7/2016 | Campagna | H04L 63/06 |
| 9,680,872 | B1 * | 6/2017 | Roth | G06F 21/44 |
| 9,893,883 | B1 * | 2/2018 | Chaubey | H04L 63/061 |
| 2005/0154890 | A1 * | 7/2005 | Vembu | H04L 9/0841 713/171 |
| 2006/0021063 | A1 * | 1/2006 | Hori | H04L 9/3066 726/27 |
| 2007/0050635 | A1 * | 3/2007 | Popp | H04L 9/3242 713/185 |
| 2007/0219915 | A1 * | 9/2007 | Hatano | H04L 9/083 705/57 |
| 2009/0232301 | A1 * | 9/2009 | Li | H04L 9/0838 380/44 |
| 2010/0161966 | A1 * | 6/2010 | Kwon | H04L 9/321 713/155 |
| 2013/0016833 | A1 * | 1/2013 | Brown | H04L 63/062 380/44 |
| 2013/0191632 | A1 * | 7/2013 | Spector | H04L 9/083 713/155 |
| 2013/0236019 | A1 * | 9/2013 | Zaverucha | H04L 63/306 380/278 |
| 2013/0332739 | A1 * | 12/2013 | Yi | H04L 9/0841 713/171 |

(Continued)

OTHER PUBLICATIONS

Brown, Daniel R. L., "Standards for Efficient Cryptography 2 (SEC 2)," Jan. 27, 2010, 37 pages, Version 2.0, Certicom Corp.

*Primary Examiner* — Aravind K Moorthy
(74) *Attorney, Agent, or Firm* — Davis Wright Tremaine LLP

(57) ABSTRACT

A system, such as an extension service, receives a first public key that is derivable based at least in part on a secret that is shared between at least a first device and a second device. The system, in an embodiment, derives a cryptographic key based at least in part on the first public key and transmits a second public key that enables another system to derive the cryptographic key. In an embodiment, the cryptographic key is a symmetric key and the system lacks access to a first private key that corresponds to the first public key.

20 Claims, 8 Drawing Sheets

(56) References Cited

U.S. PATENT DOCUMENTS

| | | | |
|---|---|---|---|
| 2015/0089244 A1* | 3/2015 | Roth | G06F 21/6209 |
| | | | 713/193 |
| 2015/0134965 A1* | 5/2015 | Morenius | G06F 21/57 |
| | | | 713/172 |
| 2015/0288679 A1* | 10/2015 | Ben-Nun | H04L 67/141 |
| | | | 726/10 |
| 2015/0358157 A1* | 12/2015 | Zhang | H04L 9/0852 |
| | | | 380/278 |
| 2015/0372811 A1* | 12/2015 | Le Saint | H04L 9/0841 |
| | | | 705/76 |
| 2017/0180132 A1* | 6/2017 | Osborne | H04L 9/3247 |
| 2017/0214670 A1* | 7/2017 | McCallum | H04L 63/045 |
| 2017/0324548 A1* | 11/2017 | Anshel | H04L 9/14 |
| 2017/0357798 A1* | 12/2017 | Khan | G06F 21/45 |
| 2018/0157840 A1* | 6/2018 | Crowley | H04L 9/0866 |
| 2018/0181764 A1* | 6/2018 | Huntley | G06F 21/602 |
| 2018/0183774 A1* | 6/2018 | Campagna | H04L 63/067 |
| 2018/0227279 A1* | 8/2018 | Kim | H04L 9/14 |
| 2018/0262341 A1* | 9/2018 | Cheng | G06F 21/64 |
| 2018/0278585 A1* | 9/2018 | Lurey | H04L 9/0894 |
| 2018/0323973 A1* | 11/2018 | Soukharev | H04L 9/3066 |
| 2019/0052468 A1* | 2/2019 | Ngoc-Ai Lu | H04L 9/0869 |
| 2019/0087115 A1* | 3/2019 | Li | G06F 3/0641 |
| 2019/0102465 A1* | 4/2019 | Yang | G06F 16/9535 |

\* cited by examiner

MECHANISM TO ALLOW THIRD PARTY TO USE A SHARED SECRET BETWEEN TWO PARTIES WITHOUT REVEALING THE SECRET

BACKGROUND

The security of computing resources and associated data is of high importance in many contexts. As an example, networks of computing devices may be utilized to provide a robust set of services to their users. In many cases, a service of a computing resource service provider provides various types of functionality to a plurality of client and utilizes various types of computer security measures to, for example, protect from unauthorized access to communications between a service and a client. A cryptographic key, such as a symmetric key, can be used by a server and client to communicate with cryptographically verifiable assurances of confidentiality, authenticity, and/or integrity.

As described above, a service can be used to provide various types of functionality to a client, and in some cases, there may be advantages to cost and efficiency of a system to off-load tasks of the service to another entity, such as a child service or micro-service. For security reasons, it may be desirable to not expose a cryptographic key that is accessible by a server and a client to another entity such as a child service or micro-service. Furthermore, it may be desirable to not require a client to re-provision data storage systems to support communications with a child service or micro-service.

BRIEF DESCRIPTION OF THE DRAWINGS

Various techniques will be described with reference to the drawings, in which.

DETAILED DESCRIPTION

Figure 1:
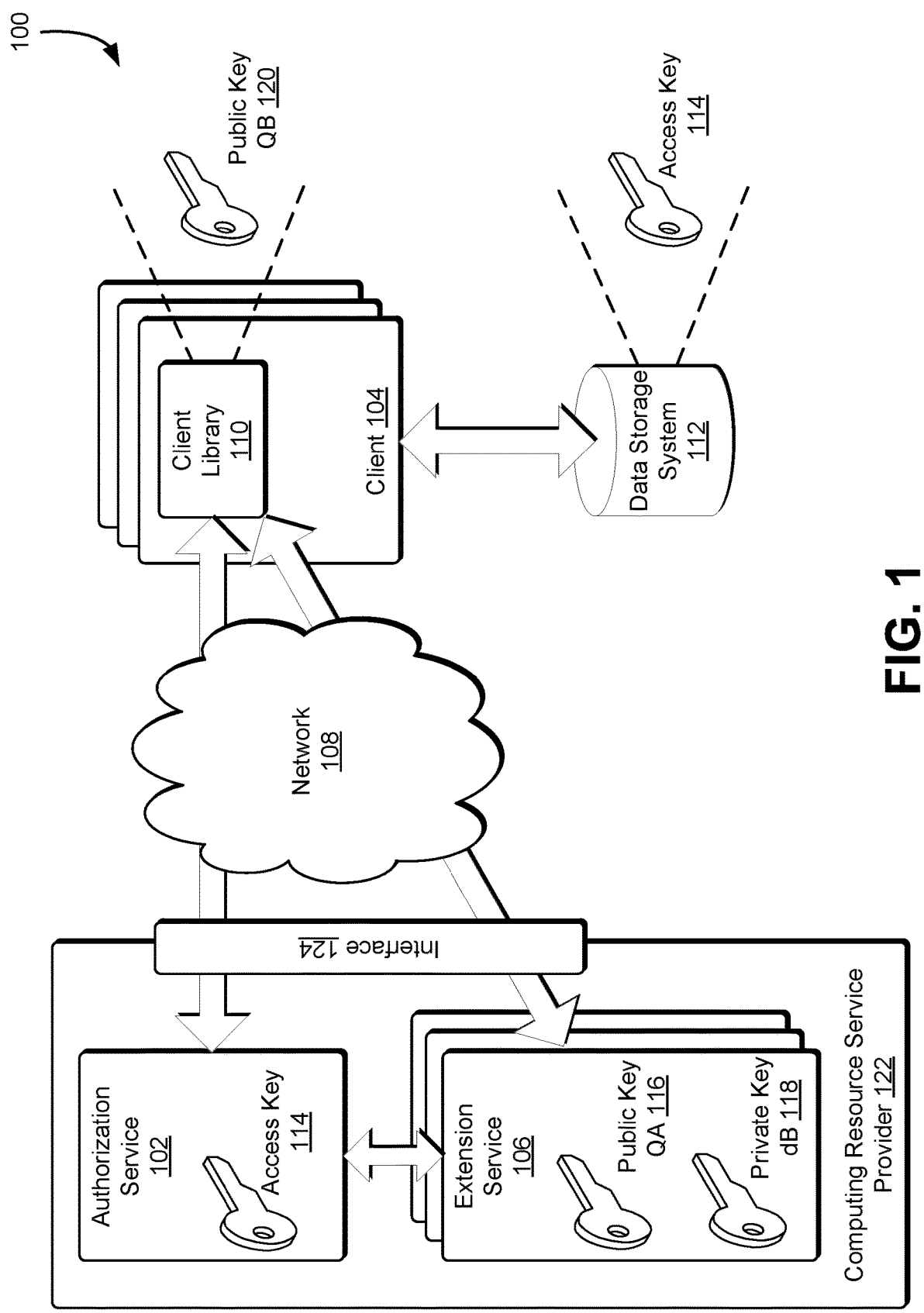
FIG. 1 illustrates a system in accordance with an embodiment.

In an embodiment, a service has a large number of client services and/or customers that interact with the service to provide various functionality such as identity and access management related services. In an embodiment, the service and client has provisioned shared secrets with its clients and the server and client securely store the shared secret by using a cryptography module such as a hardware security module. In an embodiment, the shared secret is a symmetric cryptographic key that is used for protecting the confidentiality and integrity of data communicated between the client and the server. The service, in an embodiment, is a service of a computing resource service provider that includes various other services such as micro-services or child services which the service delegates various responsibilities to—for example, in an embodiment, various web service application programming interface (API) requests from the client to the service are routed to a micro-service (also referred to as a child service, external service, or extension service) and the micro-service fulfills the request.

Accordingly, in an embodiment, communications between the client and micro-service utilize cryptographic assurances of confidentiality and/or integrity. In an embodiment, techniques described herein are implemented to enable to share a public key with the micro-service and a private key with the client without re-provisioning and re-deploying client systems to store additional cryptographic material. In an embodiment, a shared secret between a service and a client is re-provisioned to create an asymmetric key pair that is used by a micro-service and the client to communicate in a secure manner (e.g., with cryptographically verifiable assurance of authenticity, integrity, and/or confidentiality). In an embodiment, the client does not need to be re-provisioned to store additional cryptographic material and simultaneously support multiple micro-services, and the threat surface of the shared secret is limited because the shared secret is not exposed to the micro-service(s), thereby improving the security of the system. In an embodiment, elliptic curve cryptography is used to facilitate the sharing of the asymmetric key pair between the client and the micro-service.

In an embodiment, a process that allows third parties to use a shared secret SK between a service and a client without revealing the secret includes: the service generating a public key FK using the shared secret SK which is known to the service and the client and should be kept secret from the third party; the service sending the public key FK to the micro-service which stores the public key FK; the micro-service receives a request from the client and generates an asymmetric key pair with a private key d and a corresponding public key Q; the micro-service calculates a session secret, such as by multiplying the public key FK (or a value derived from it) with the private key d (or a value derived from it); the micro-service derives an encryption key and an authentication key from the session secret and generates a response that is encrypted under the encryption key and has authentication data (e.g., an authentication tag) generated using the authentication key; the response and public key Q are transmitted to the client, which generates the public key FK using the shared secret SK and calculates the session secret using the shared secret SK and the public key Q; the client derives a decryption key (which, in the case of a symmetric cryptography scheme, is the same as the encryption key) and authentication key from the session secret and decrypts and verifies the response. In an embodiment, the key-pairs described in this process are elliptic curve cryptography (ECC) key-pairs, a set of domain parameters are available to each of the entities described above, and multiplication refers to point multiplication.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram of a system 100 in which an embodiment in accordance with this disclosure is implemented. In an embodiment, a shared secret is utilized to send data confidentially (i.e., with cryptographically verifiable assurances of confidentiality) without sharing the secret or changing the secret provisioned. In an embodiment, the shared secret is the access key 114 that is accessible and/or known to an authorization service 102 and a client 104 and is not—and should not—be made known to an extension service 106. FIG. 1 illustrates, in an embodiment, a system in which a secret shared between the authorization service 102 and the client 104 is used to create cryptographic material that is used by the extension service 106 to protect communications between the client 104 and the extension service 106.

In an embodiment, the authorization service 102 is a service of a computing resource service provider 122 and is hosted on a fleet of one or more computer servers that are used to receive requests from client computer systems (e.g., client 104 illustrated in FIG. 1) via an interface 124 such as a web service application programming interface (API). In an embodiment, the authorization service 102 stores or otherwise has access to an access key 114 that is a shared secret accessible and/or known to the authorization service 102 and the client 104 and is kept secret from the extension service 106. Generally speaking, a trust boundary is used to identify threats to a system and the permissible flow of data between various subsystems of a system and, in an embodiment, is used to identify a boundary between the extension service 106 and the authorization service 102 and/or client 104 that indicates that data such as the access key 114 should not be shared outside of the trust boundary (i.e., to the extension service 106). In an embodiment, the authorization service 102 includes executable code that, if executed by one or more processors of a computer system, causes the computer system to use the access key 114 generate a public key $Q_A$ 116.

In an embodiment, the client 104 is a client computer system that includes at least a client library 110. In an embodiment, the client library 110 is a component of a software application (e.g., a library that is statically or dynamically linked to an executable program or a plugin) and includes executable code that, if executed by one or more processors of the computer system, causes the computer system to communicate with the authorization service 102, another service of a computing resource service provider 122 (e.g., the extension service 106 illustrated in FIG. 1), or any combination thereof. In an embodiment, an interface 124 such as a web service API is used by the client to issue requests to a service and the request is routed to the service (e.g., via one or more intermediary network routing and/or switching device). In an embodiment, the client 104 is a computer system that has access to a data storage system 112 such as a hard disk drive attached to the computer system. In an embodiment, the access key 114 is stored in the data storage system 112 and is accessible by the client library 110. In an embodiment, as part of a mechanism to allow a third party to use a shard secret between two parties without revealing the secret, the client library 110 receives a public key $Q_B$ 120 and retains it in any suitable manner such that the client 104 and/or data storage system 112 do not need to be re-provisioned—for example, in an embodiment, the public key $Q_B$ 120 is retained in a short-term memory address space associated with the client application.

In an embodiment, the extension service 106 is a service of a computing resource service provider 122 and is hosted on a fleet of one or more computer servers that are used to receive requests from client computer systems (e.g., client 104 illustrated in FIG. 1) via an interface 124 such as a web service application programming interface (API). In an embodiment, the extension service 106 is a micro-service or child service that the authorization service 102 launches to provide additional functionality, such as support for additional APIs which are added to a software development kit (SDK) in an updated version of the SDK. In an embodiment, the authorization service 102 delegates the fulfillment of one or more tasks (e.g., web service API requests) to a microservice such as the extension service 106. In an embodiment, a trust boundary exists between the authorization service 102 and the extension service 106 where, according the trust boundary, data such as the access key 114 should not be shared from the authorization service 102 to components such as the extension service 106 outside of the trust boundary. In an embodiment, the authorization service 102 utilizes multiple micro-services to implement various aspects of a service by, for example, categorizing web service API requests into different categories and delegating some or all API requests of a particular category to a particular micro-service.

In an embodiment, the extension service 106 stores and/or has access to a public key $Q_A$ 116 that the extension service 106 receives from the authorization service 102 either directly (e.g., the authorization service 102 sends a packet including the public key $Q_A$ 116 to the extension service 106) or indirectly (e.g., the authorization service 102 stores the public key $Q_A$ 116 in a storage location that is accessible to the extension service 106 and provides the extension service 106 with an identifier such as a uniform resource identifier (URI) that can be used to locate the storage location). In an embodiment, the extension service 106 generates a private key $d_B$ 118 and a corresponding public key $Q_B$ 120 in accordance with an Elliptic Curve Diffie-Hellman (ECDH) key exchange protocol. In an embodiment, the private key $d_B$ 118 is not shared with other computing entities such as the authorization service 102 and the client 104. In an embodiment, an ECC point multiplication operation is performed to calculate the product of the private key $d_B$ 118 or a value derived thereof and a known point G on the curve. In an embodiment, the point G is a domain parameter that is publicly available (e.g., obtainable by the entities described in connection with FIG. 1). In an embodiment, the public key $Q_A$ 116 and the private key $d_B$ 118 are used in techniques for using the access key 114 to enable the extension service 106 to securely communicate with the client 104 without revealing the access key 11 to the extension service 106.

In an embodiment, the network 108 is an intranet, the Internet, a cellular network, a local area network, a satellite network and/or any other such network and/or combination thereof. In an embodiment, the client 104 communicates with a computing resource service provider 122 via the network 108 using a set of APIs that is defined in a SDK installed on the client computing device. In an embodiment, various components of the computing resource service provider 122 communicate with each other using the network 108.

The data storage system 112, in an embodiment, stores and/or is configured to store cryptographic material such as the access key 114. In an embodiment, the access key 114 is stored in a secure manner—in this context, secure storage can refer to storage in an encrypted format, storage within a device that, upon detecting an attempt to physically (e.g., physically disassembling to device to access a physical medium used to store data) or logically tamper (e.g., attempting to access the data from an unauthorized process or side channel) with the device, destroys data contained within the device, and more. In an embodiment, the data storage system 112 is a cryptography module such as a hardware security module (HSM), trusted platform module (TPM).

As noted above, in an embodiment, cryptographic material (i.e., secret(s) such as cryptographic keys) is securely stored within a cryptographic module. In an embodiment, the cryptographic module is implemented as or may contain a physically unclonable function (PUF), which is a function implemented in physical hardware to use one or more secrets that are based at least in part on physical characteristics of the PUF. As a result, in an embodiment, any attempt to obtain a secret alters the physical characteristics of the PUF, thereby destroying the secret. Example PUFs that may be used include PUFs using explicitly introduced randomness, optical PUFs, coating PUFs, PUFs using intrinsic randomness, delay PUFs, static random access memory (SRAM) PUFs, butterfly PUFs, bi-stable ring PUFs, magnetic PUFs, metal resistance PUFs and/or other devices whose physical characteristics encode information usable as or for a secret.

In an embodiment, the access key 114 is a secret shared between the authorization service 102 and the client 104 which is not, and should not, be revealed to the extension service 106. In an embodiment, the access key 114 is a symmetric cryptographic key and a key stretching or key derivation technique is used to generate a derived key (not shown in FIG. 1), the derived key is used to generate the public key $Q_A$ wherein the derived key $d_A$ is the asymmetric private key and the product of $d_A$ and G is the asymmetric public key $Q_A$. In an embodiment, the access key 114 is a symmetric key and the key derived using a key derivation function such as Password-Based Key Derivation Function 2 (PBKDF2) is used as a public key in accordance with a Diffie-Hellman key exchange protocol. In an embodiment, an ECC point multiplication using the access key 114 (e.g., a point on the elliptic curve derived from the access key 114) and a known point G on the elliptic curve generates the public key $Q_A$, thereby forming an Elliptic curve cryptography (ECC) key-pair $\{d_A, Q_A\}$.

In an embodiment, the interface 124 is used by the client 104 to communicate with the computing resource service provider 122. In an embodiment, the interface is a web service application programming interface. In an embodiment, a separate interface is used by the client 104 to communicate with various services of the computing resource service provider—for example, a first interface is used to communicate with the authorization service 102 and a second interface is used to communicate with the extension service 106. In an embodiment, the interface includes a set of commands or requests that are supported as part of a SDK that is supported by the client library 110.

It should be noted that while FIG. 1 illustrates a system that, in one embodiment, has a shared secret is accessible and/or known to an authorization service 102 and a client 104 and is not known to an extension service 106, there are various contexts in which techniques described herein are implemented. In an embodiment, an online merchant (e.g., an online retailer of goods or services) and a payment processor share a symmetric key and utilizes techniques as described in this disclosure to facilitate payments—for example, in an embodiment, the online merchant generates a public key from the symmetric key and provides that public key to a customer making an online purchase. In this example, the symmetric key is a shared secret that is accessible and/or known to the online merchant and the payment processor (e.g., a credit card payment processor) and should not be made known to the customer. Continuing with the examine, the customer can transmit his or her credit card information directly to the payment processor using the public key without revealing the credit card information to the online merchant (e.g., by encrypting the credit card information using the public key). Accordingly, computer security is improved because the customer does not to expose sensitive information (e.g., the credit card number) to an online retailer, thereby reducing risk to the customer (i.e., a breach of security of the online merchant will not expose the customer's credit card information).

In an embodiment, an embedded device—also referred to an Internet-of-Things (IoT) device is configured with an access key for communications with a service provider of the embedded device. It should furthermore be noted that, in an embodiment, provisioning embedded devices of a service provider with additional keys is cost prohibitive (e.g., embedded devices have limited memory and/or storage for additional keys). In an embodiment, an embedded device shares a symmetric key $SK_1$ with the IoT service provider while a different embedded device shares a second symmetric key $SK_2$ with the service provider. In an embodiment, the embedded devices interact with each other in a decentralized or ad-hoc manner (e.g., via a wireless ad-hoc network) and perform a key exchange by having the IoT service provider generate a public key corresponding to $SK_1$ and another public key corresponding to $SK_2$ and sending the keys to respectively, the second embedded device and the first embedded device, and the embedded devices can use the public keys to establish a shared secret using techniques described herein, such as in connection with FIG. 2. In an embodiment, the IoT service provider certifies authenticity of the public keys generated in any suitable manner, such as by generating a digital signature over the generated keys.

Figure 2:
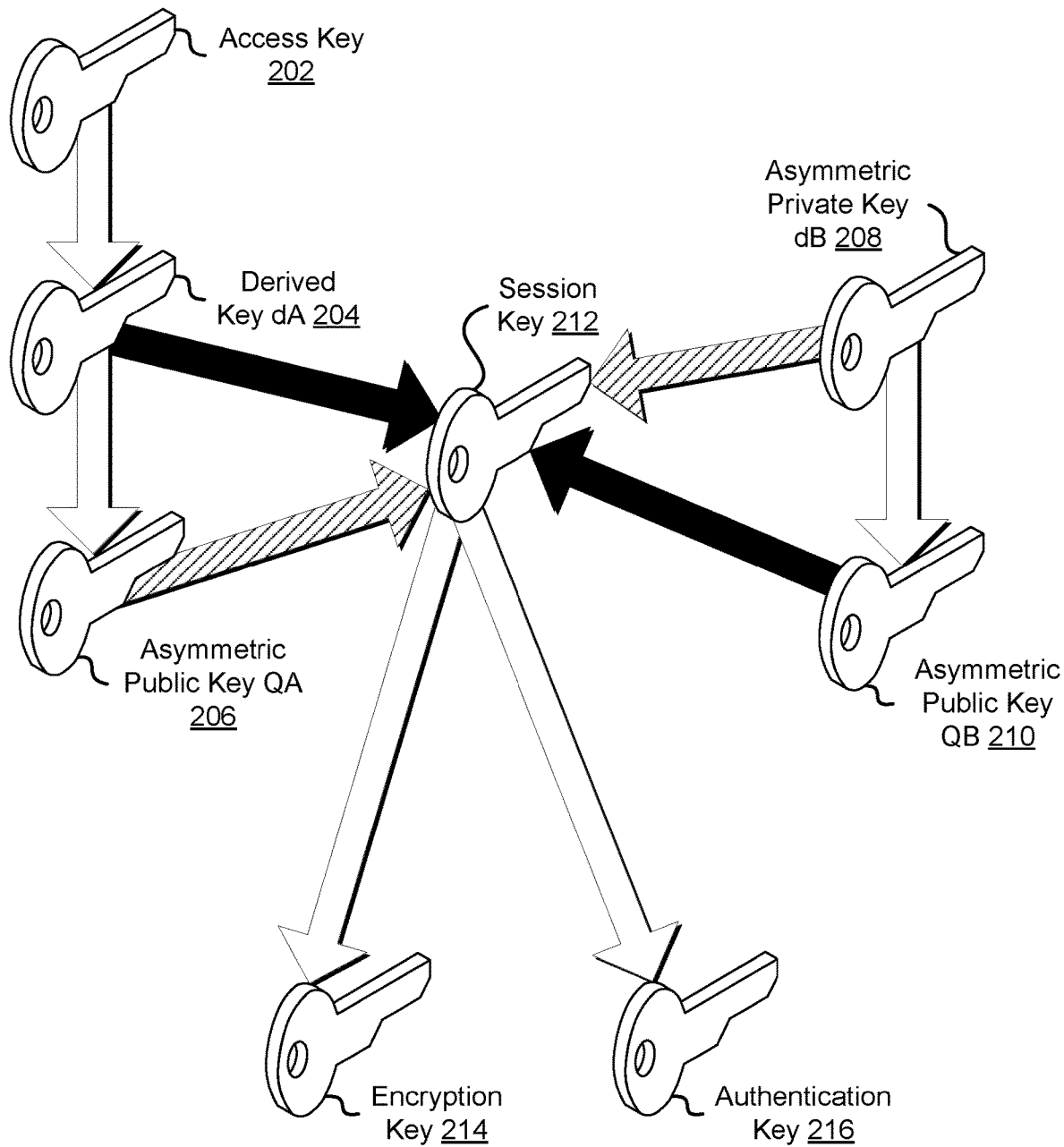
FIG. 2 illustrates a diagram of the relationship between various cryptographic keys, in an embodiment.

FIG. 2 illustrates a diagram of the relationship between various cryptographic keys, in an embodiment. In an embodiment, the cryptographic keys described in connection with FIG. 2 are utilized in the context of a system implemented in accordance with FIG. 1. In an embodiment, the access key 202 is a symmetric cryptographic key that is a secret shared between two entities which is not, and should not be, revealed to a third party. In an embodiment, techniques described herein describe how to allow the third party to use the shared secret between two parties without revealing the secret. In an embodiment, the access key 202 is used to establish a cryptographically protected communication session between the two parties—for example, the access key 202 is used to establish a transport layer security (TLS) session between the authorization service and client illustrated in FIG. 1.

In an embodiment, a key stretching or key derivation routine uses the access key 202 to generate a derived key $d_A$ 204. An example of a key derivation routine is Password-Based Key Derivation Function 2 (PBKDF2). In an embodiment, a system, such as those described in connection with other figures of this disclosure, determines whether to perform a key stretching or key derivation routine by determining the security level of the access key and whether it is sufficiently strong. In an embodiment, if the security level is too weak, a key stretching or key derivation is used to generate a derived key $d_A$ 204—, if the access key 202 is sufficiently strong, then the access key 202 is used directly instead of the derived key $d_A$ 204. It should be noted that in this context, the strength of a key, in an embodiment, refers to how resilient a particular key, under a cryptographic algorithm, is to an attack by an adversary, such as a brute force attack. For example, a 128-bit access key can be used to generate a 512-bit derived key using PBKDF2:

PBKDF2(*AK*,"Key1")|PBKDF2(*AK*,"Key2")

where AK refers to the access key, the pipe '|' refers to a concatenation operation, and the PBKDF2 function accepts as inputs the key to extend and salt values "Key1" and "Key2"—it should be noted that the salt values can be any suitable value so long as they are different from each other. Furthermore, it should be noted that the salt values can be combined with the input key in any suitable manner and that the concatenation of the access key with the salt values is merely described as a non-limiting illustrative example in accordance with one embodiment. It should be further noted that key stretching techniques such as those described above are suitable for deriving keys of any suitable length and are, in an embodiment specifiable by a client—for example, a client can specify a desired key length of 512-bits, 1024-bits, 2048-bits, and more. In an embodiment, any suitable key stretching or key derivation routine can be utilized in place of PBKDF2. In an embodiment, a suitable key stretching or key derivation function utilizes a hash-based message authentication code (HMAC) function. In an embodiment, the derived key $d_A$ 204 is used to derive an asymmetric public key $Q_A$ 206 and a session key 212.

In an embodiment, the asymmetric public key $Q_A$ 206 is generated from the derived key $d_A$ 204 and a generator g (not shown in FIG. 2). In an embodiment, a set of domain parameters selected (e.g., agreed upon by the authorization service and the client described in connection with FIG. 1) and made public. In an embodiment, the domain parameters include a finite cyclic group G of order n and a generator g which is an element of G. In an embodiment, the asymmetric public key $Q_A$ 206 is derivable from the generator and the derived key $d_A$ 204—in an embodiment, $Q_A = g^{d_A}$ where g is an element of a finite cyclic group G of order n.

Domain parameters, in an embodiment, are defined in accordance with an Elliptic Curve Diffie-Hellman (ECDH) key exchange protocol which include, among other domain parameters, a point G on an elliptic curve (also referred to as a base point, generator, generating element, or generating point) and the asymmetric public key $Q_A$ 206 is calculated by at least adding point G to itself $d_A$ times (also referred to as ECC point multiplication)—in an embodiment, $Q_A = d_A G$ where G is a point on an elliptic curve of order n where n is prime.

In an embodiment, the asymmetric private key $d_B$ 208 is randomly or pseudo-randomly generated, for example, by using a pseudo-random number generator by a client such as the client described in connection with FIG. 1. In an embodiment, the asymmetric private key $d_B$ 208 is used to generate a corresponding asymmetric public key $Q_B$ 210, forming a key-pair $\{d_B, Q_B\}$. In an embodiment, $Q_A = g^{d_A}$ where g is an element of a finite cyclic group G of order n; in an embodiment, $Q_A = d_A G$ where G is a point on an elliptic curve of order n where n is prime. In an embodiment, the asymmetric private key $d_B$ 208 is retained by a third party (e.g., an external service such as those described in accordance with FIG. 1) and not made available to entities that have access to the access key 202 in a plaintext or unobfuscated (e.g., unencrypted) format.

In an embodiment, the session key 212 is cryptographic material that a third party (e.g., an external service such as those described in connection with FIG. 1) uses for secure communications. In an embodiment, the third party generates the session key 212 from the asymmetric public key $Q_A$ 206 and the asymmetric private key $d_B$ 208. For example, in an embodiment, the session key 212 is generated by: $SK = (Q_A)^{d_B} = (g^{d_A})^{d_B} = g^{d_A * d_B}$. In an embodiment, the session key 212 is generated in accordance with an ECDH key exchange protocol where $SK = d_B * Q_A = d_B * d_A * G$ where G is a point on an elliptic curve of order n. As illustrated in FIG. 2, in an embodiment, an external service uses the asymmetric public key $Q_A$ 206 and the asymmetric private key $d_B$ 208 (indicated by the hatched arrows) to generate the session key 212. It should be noted that, in an embodiment, the respective key pairs are used to generate a session secret which is cryptographic material that is used to generate cryptographic keys—for example, the asymmetric public key $Q_A$ 206 and the asymmetric private key $d_B$ 208 (indicated by the hatched arrows) are used to generate the session secret, and the session secret is provided as an input into a pseudorandom function (PRF) to generate, as an output to the PRF, a session key. In an embodiment, the PRF also accepts a seed value as an input and is used to generate a plurality of session keys from the session secret. An example of a session secret is the session key 212 illustrated in FIG. 2.

An entity, such as the client described in connection with FIG. 1, generates the session key 212 from the derived key $d_A$ 204 and asymmetric public key $Q_B$ 210 in an embodiment (indicated by the solid arrows). The session key, in an embodiment, is generated by: $SK = (Q_B)^{d_A} = (g^{d_B})^{d_A} = g^{d_A * d_B}$. In an embodiment, the session key 212 is generated in accordance with an ECDH key exchange protocol where the session key 212 is generated from performing a point multiplication operation on the base point G where the multiplier is based on the derived key $d_A$ 204 (e.g., the value of the derived key $d_A$ 204 or a value derived thereof)—in other words, $SK = d_A * Q_B = d_A * d_B * G$ where G is the base point of an elliptic curve that is specified in a set of domain parameters.

The hatched arrows and the solid arrows to the session key 212, in an embodiment, indicate that the session key 212 can be derived by two separate entities—for example, an entity that has access to a shared secret (e.g., the access key 202) generates the session key using the derived key $d_A$ 204 and the asymmetric public key $Q_B$ 210 while a third-party entity without access to the shared secret (e.g., access key 202) generates the session key 212 from the asymmetric public key $Q_A$ 206 and the asymmetric private key $d_B$ 208 using, for example, elliptic curve point multiplication.

In an embodiment, an encryption key 214 is derived from the session key 212 and is used to encrypt a response to a request. In an embodiment, a hash-based message authentication code (HMAC) function is utilized to generate the encryption key:
EK=HMAC(SK|"Encryption Key") where EK is the encryption key 214, HMAC refers to a one-way function such as a hash-based message authentication code (HMAC) function, SK is the session key 212, the pipe corresponds to a concatenation operation, and "Encryption Key" is an additional value that is concatenated to the session key. It should be noted that the additional value can be any suitable value different from the additional value used to generate the authentication key 216 as described elsewhere in this disclosure. In an embodiment, a third party entity, such as an external service described in connection with FIG. 1, generates the encryption key 214, encrypts a response to a request using the encryption key 214, provides the encrypted response and the asymmetric public key $Q_B$ 210 to an entity that has access to the access key 202 (e.g., a client described in connection with FIG. 1), the entity constructs the derived key $d_A$ 204, generates the session key 212 with the derived key $d_A$ 204 and the asymmetric public key $Q_B$ 210, generates the encryption key 214 with the session key 212, and decrypts the encrypted response with the encryption key 214.

In an embodiment, an authentication key 216 is derived from the session key 212 and is used to encrypt a response to a request. In an embodiment, a hash-based message authentication code (HMAC) function is utilized to generate the encryption key: MK=HMAC(SK|"MAC Key") where MK is the authentication key 216, HMAC refers to a one-way function such as a hash-based message authentication code (HMAC) function, SK is the session key 212, the pipe corresponds to a concatenation operation, and "MAC Key" is an additional value that is concatenated to the session key. It should be noted that the additional value can be any suitable value different from the additional value used to generate the encryption key 214 as described elsewhere in this disclosure. In an embodiment, the authentication key 216 is used to generate authentication data that can be used to provide cryptographically verifiable assurances of authenticity and integrity. In an embodiment, authenticity refer to assurances that a message was created by a party purporting to be the author of the message and integrity refers to assurances that a received message was not modified either intentionally (e.g., by a malicious party) or unintentionally (e.g., as a result of signal loss during transmission) from its original form when the message was transmitted.

In an embodiment the encryption key 214 and the authentication key 216 are utilized in various configurations. In an embodiment, a message (e.g., a response) is encrypted first using the encryption key 214 and an authentication tag is generated over the encrypted message using the authentication key 216; in an embodiment, the plaintext message is encrypted and the authentication tag is generated over the plaintext message; in an embodiment, the authentication tag is generated over the plaintext message and both the plaintext message and the authentication tag are encrypted together; and more.

In an embodiment, at least some of the cryptographic keys illustrated in FIG. 2 are scoped to a particular set of uses. Generally speaking, in an embodiment, a first key has a first key scope that corresponds to a set of uses for which the first key is usable (e.g., a set of uses for which use of the first key is usable for successful authentication of messages). The first key, in an embodiment, is the session key 212 that a key that is derivable by at least two entities, such as the external service and client described elsewhere in connection with FIG. 1. As an example, the first key, through appropriate derivation, is usable in multiple regions of a computing resource service provider by using an encoding of each region to derive, from the first key, a suitable regional key, in accordance with one embodiment.

Accordingly, the first key is used to derive a second key having a second key scope in accordance with an embodiment. For example, the first key, in an embodiment, is the session key 212 and is used to derive keys of various scope, such as an encryption key 214 that is suitable for a first set of uses that includes encryption and decryption operations and an authentication key 216 that is suitable for a second set of uses that includes generating an authentication tag (e.g., a MAC tag) and verifying the validity of a purportedly authentic tag. It should be noted that such sets of uses need not be mutually exclusive and, in an embodiment, include at least some uses which overlap as between various scopes. While omitted from the drawing to avoid obscuring the illustration, the first key (e.g., the session key 212 illustrated in FIG. 2), in an embodiment, is used to derive additional scoped keys, each with a key scope. In an embodiment, the second key is used to derive a third key, which can be used to derive another key, and so on. In an embodiment, a series of keys is derived one from another, using the following formula, or variations thereof:

$$K_N = F_{N-1}(K_{N-1}, R_{N-1})$$

where $K_N$ is the Nth derived key (N being a positive integer), $F_{N-1}$ is a one-way function or otherwise based, at least in part, on a one-way function, such as a cryptographic hash function, message authentication code algorithm, or a key derivation function, described above, and $R_{N-1}$ is an encoding of a restriction, a scoping of uses, a defined set of uses, a defined set of restrictions on uses, or any other suitable encoding format. Accordingly, in an embodiment, the allowable scope of use for $K_N$ is the scope of use of $K_{N-1}$ restricted by the restriction corresponding to $R_{N-1}$. Each encoding of a restriction $R_1$ may be an encoding of a different restriction. In an embodiment, R is a sequence of bits representing the restriction, which is derived from a string that indicates the restriction(s). Each function $F_i$ may be the same function or different functions $F_i$ (for some or all different values of i) may be different—for example, in an embodiment, $F_i$ and $F_j$ are different functions for i≠j. In an embodiment, values for R are considered restrictions because, due to the mathematical properties of the function(s) F, access to the values of R and output of $F_{N+1}$, without a cryptographic key used to generate the output of $F_{N-1}$ does not provide access to the cryptographic key. In an embodiment, F is a one-way function, examples of which include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). In an embodiment, access to one or more resources is managed by distributing derived cryptographic keys in according to the restrictions corresponding to the values of R—for example, a key management system manage keys for multiple regions. In an embodiment, a single root key is used to derive multiple regional keys, each derived with a different value of R corresponding to a different region and regional keys are transferred to regional systems. In an embodiment, various components as described in connection with FIG. 1 are in different regions, the same region, or combinations thereof.

Figure 3:
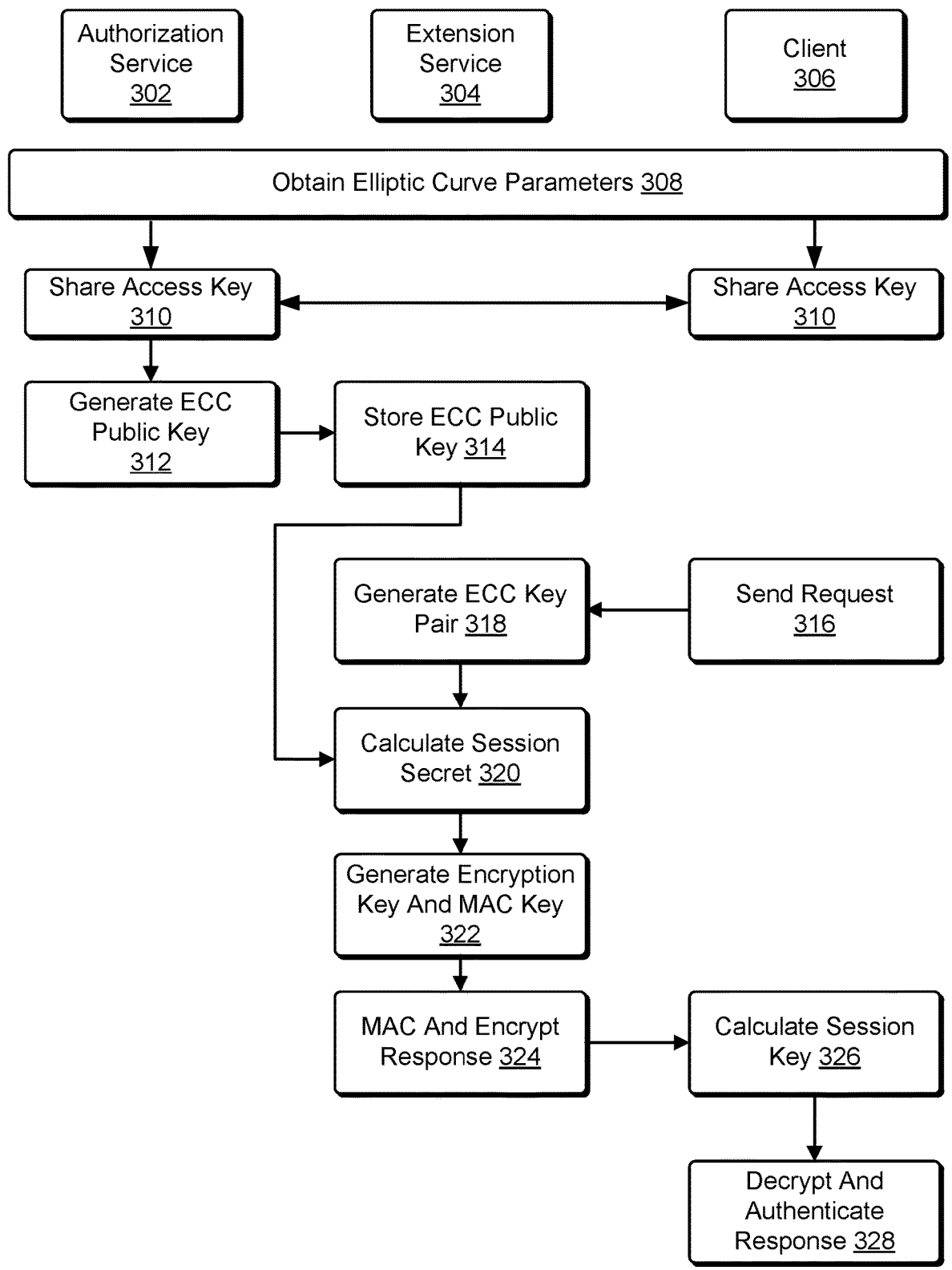
FIG. 3 illustrates a diagram of a mechanism that allows a third party to use a shared secret between two parties without revealing the secret using elliptic curve cryptography, in accordance with one embodiment.

FIG. 3 illustrates a diagram of a mechanism that allows a third party to use a shared secret between two parties without revealing the secret using elliptic curve cryptography, in accordance with one embodiment. In an embodiment, FIG. 3 is implemented using a system in accordance with those described in connection with FIG. 1 and apply techniques described elsewhere such as in connection with FIG. 2.

The authorization service, the extension service, and the client obtain 308 elliptic curve parameters which, in an embodiment, are elliptic curve domain parameters that comprise: an integer p that specifies a finite field $F_p$; two elements a and b specifying an elliptic curve according to the following equation:

$$y^2=x^3+ax+b;$$

a base point G on the elliptic curve (also referred to as a generator, generator point, generating element); a prime n which is the order of G, and an integer h, which is a cofactor that is used as part of determining the points of the elliptic curve to be used. In an embodiment, the elliptic curve domains is the set of parameters (p, a, b, G, n, h). In an embodiment, the elliptic curve domain parameters are agreed upon by the authorization service 302 and the client 306 as part of the generation and/or distribution of the access key as described in connection with step 310. In an embodiment, the elliptic curve domain parameters are agreed upon by the authorization service 302, the extension service 304, and the client 306 as part of a mechanism to allow a third party to use a shared secret between two parties without revealing the secret to the third party. In an embodiment, the elliptic curve parameters are made publicly available—for example, the elliptic curve domain parameters are published in accordance to an industry and/or government standard, a communications protocol, and/or are accessible via a web service API supported by the computing resource service provider.

In an embodiment, an access key is a secret that is shared 310 between at least the authorization service 302 and the client 306 as illustrated in FIG. 3. In an embodiment, the shared secret is not revealed to the extension service 304 in plaintext form, although such need not be the case—the external service, in an embodiment, has access to the shared secret and it is not to be revealed to another entity (not illustrated in FIG. 3). In an embodiment, the access key is agreed upon by the authorization service 302 and the client 306 as part of a handshake protocol and/or as part of establishing a cryptographically protected communications session. In an embodiment, a cryptographically protected communications session is a set of communications that are capable of providing various types of cryptographic assurances—as an example, a protocol that supports cryptographically verifiable assurances of confidentiality, authenticity and/or integrity is a cryptographically protected communications session, even if such assurances are not supported on every message of the protocol (e.g., an initial request to establish a cryptographically protected communications is a plaintext message identifying the requestor). In an embodiment, the access key is a symmetric cryptographic key; in an embodiment, the access key is an asymmetric private key of an asymmetric key pair having a corresponding asymmetric public key.

An entity, such as the authorization service illustrated in FIG. 3, generates 312 an ECC public key from the access key in accordance with one embodiment. An elliptic curve point multiplication, in an embodiment, is used to calculate the public key using the base point G and the access key (or a value derived thereof) as a multiplier—in other words, the base point G is iteratively added to itself a number of times equal to a value corresponding to the access key. In an embodiment, the ECC public key is provided to the external service and the external service stores 314 the ECC public key using a data storage service of a computing resource service provider. In an embodiment, the entity is a computer system that includes executable code that, if executed by one or more processors of a system, causes the system to generate an ECC public key $Q_A$ from the access key AK by computing:

$$Q_A = AK*G$$

where the '*' operator indicated above refers to an elliptic curve point multiplication operation. In an embodiment, the access key AK and the ECC public key $Q_A$ form an ECC key pair that is in accordance with an Elliptic Curve Diffie-Hellman (ECDH) key exchange protocol.

In an embodiment, an entity, such as the client illustrated in FIG. 3, sends 316 a request to the extension service 304 such as a request to establish a cryptographically protected communications session. In an embodiment, the request includes information that identifies the client and/or is associated with the public key that was generated from the access key. In an embodiment, the extension service receives the request (e.g., a web service API request) and generates 318 an ECC key pair. In an embodiment, the extension service is a computer system that includes executable code that, if executed by one or more processors of a computer system, causes the system to generate an ECC private key $d_B$ in any suitable manner, such as by using a random number generator or pseudo-random number generator. In an embodiment, the ECC private key $d_B$ is used to generate the corresponding ECC public key $Q_B$ by computing:

$$Q_B = d_B*G$$

where the '*' operator indicated above refers to an elliptic curve point multiplication operation. In an embodiment, the ECC key pair comprising $\{d_B, Q_B\}$ is in accordance with an Elliptic Curve Diffie-Hellman (ECDH) key exchange protocol.

After generating the ECC key pair, the system calculates 320 a session secret which, in an embodiment, is a symmetric cryptographic key. In an embodiment, the session secret is suitable for use as part of an asymmetric key pair, for example, as a public or private key of a key pair. In an embodiment, a suitable system include executable code that, if executed on one or more processors of a system, causes the system to use the ECC private key $d_B$ and the ECC public key $Q_A$ to compute the session secret SK:

$$SK = d_B*Q_A = d_B*AK*G$$

where the '*' operator indicated above refers to an elliptic curve point multiplication operation.

In an embodiment, the session key is used to generate 322 encryption and MAC keys using, for example techniques described above in connection with FIG. 2. In an embodiment, a response to the received request is encrypted and/or an authentication tag is generated 324 using any suitable techniques in connection with the encryption and authentication keys that are generated. For example, a one-way function is used to generate an authentication tag in accordance with one embodiment. Generally speaking, the use of both encryption and authentication is not required, and, in an embodiment, either, both, or neither is performed. For example, in some cases, the response is not encrypted and not authenticated. In an embodiment where the response is neither encrypted nor authenticated, a system receives a response that includes a public key that is digitally signed by a trusted entity such as a certificate authority wherein validity of the digital signature is cryptographically verifiable by a recipient of the digital certificate. In an embodiment, the system generates a ciphertext response and an authentication tag and provides to the client, in response to the request, the ciphertext response, the authentication tag, and the public key $Q_B$ to enable derivation of the session key by the client 306.

In an embodiment, the client receives a response to the request that includes a ciphertext, an authentication tag, and a public key $Q_B$ that enables derivation of the session key. In an embodiment, the client calculates 326 the session key using the public key $Q_B$ and the access key AK:

$$SK=AK*Q_B=AK*d_B*G$$

where the '*' operator indicated above refers to an elliptic curve point multiplication operation. It should be noted that the result of the calculation is the same as result of calculating the session key using the ECC private key $d_B$ and the ECC public key $Q_A$ as described above. After deriving the session key, the system can furthermore derive any encryption and/or authentication keys that were utilized by the extension service as part of processing the response. The encryption and/or authentication keys, in an embodiment, are used to decrypt and authenticate 328 the response, for example, by decrypting the ciphertext and verifying that a generated hash output matches the expected output indicated by the authentication tag.

Figure 4:
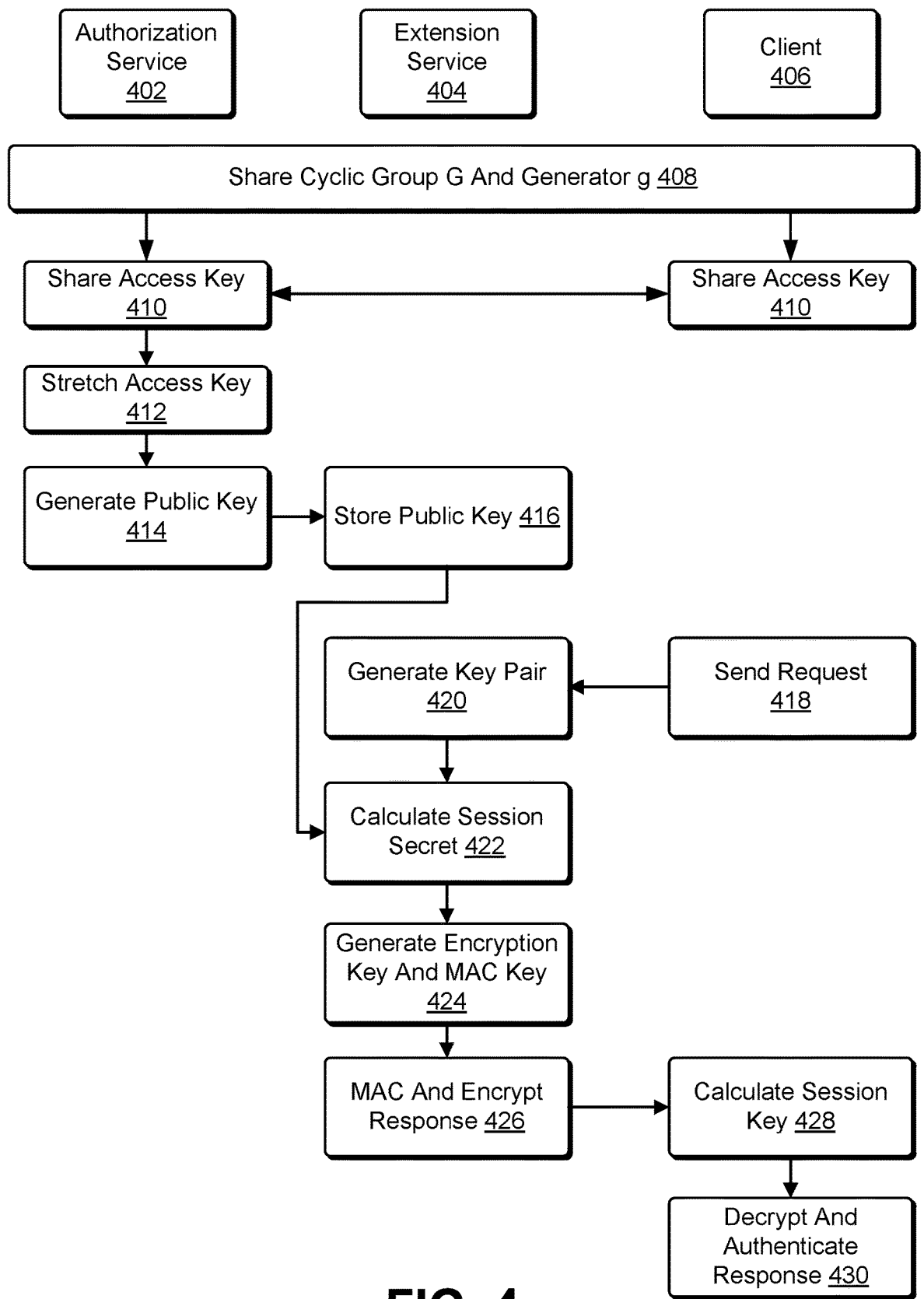
FIG. 4 illustrates a diagram of a mechanism that allows a third party to use a shared secret between two parties without revealing the secret, in accordance with one embodiment.

FIG. 4 illustrates a diagram of a mechanism that allows a third party to use a shared secret between two parties without revealing the secret, in accordance with one embodiment. In an embodiment, FIG. 4 is implemented using a system in accordance with those described in connection with FIG. 1 and apply techniques described elsewhere such as in connection with FIGS. 2 and 3.

In an embodiment, a set of parameters is made available or shared 408 between the authorization service 402, the extension service 404, and the client 406 that includes at least a finite cyclic group G of order n and a generator point g. In an embodiment, a prime p where g is a primitive root modulo p is also shared. The generator point g may also be referred to as a generator or generating element. The parameter values, in an embodiment, are selected in accordance with various techniques utilized in connection with a Diffie-Hellman key exchange protocol. In an embodiment, the parameters are selected as part of a process for sharing the access key between at least the authorization service 402 and the client 406. In an embodiment, the parameters are made available via a web service API request or any suitable uniform resource identifier (URI) such as a uniform resource locator (URL).

In an embodiment, an access key is a symmetric key that is shared 410 between at least the authorization service 402 and the client 406. In an embodiment, the access key has a predetermined level of security (e.g., a number of bits of security that corresponds to how resilient the key, in accordance with a cryptography algorithm, is to the most efficient known attack which, in some cases, is a brute force attack). In an embodiment, a system such as the authorization service 402 determines that it is appropriate to perform a a key stretching or key derivation routine in connection with using the access key to generate an asymmetric private key.

In an embodiment, the authorization service stretches 412 the access key using a key stretching or derivation function such as Password-Based Key Derivation Function 2 (PBKDF2), thereby generating an asymmetric private key $d_A$ from the access key. In an embodiment, the key stretching or key derivation function utilizes a salt value. Generally speaking, the private key sizes utilized for cryptographically protected communications are larger than those required for symmetric keys—as an example, a 128-bit access key AK is used to generate a 512-bit derived private key a using PBKDF2:

$$a=PBKDF2(AK,\text{Key1})|PBKDF2(AK,\text{Key2})$$

where AK refers to the access key, the pipe '|' refers to a concatenation operation, and the PBKDF2 function accepts as inputs the key to extend and salt values. Of course, key stretching techniques such as those just described allow for cryptographic keys to create arbitrary sized private keys for various forms of Diffie-Hellman style or similar exchanges as needed.

In an embodiment, the generator point g and the private key a are used to generate 414 an asymmetric public key. For example, in an embodiment that generates key pairs in accordance to a Diffie-Hellman key exchange protocol, the corresponding public key A is calculated as:

$$A=g^a \bmod p$$

where g is an element of a finite cyclic group G of order n, a is the corresponding private key value, and p is the prime where g is a primitive root modulo p. In an embodiment, the authorization service 402 sends the public key A to the extension service 404 and the extension service receives and stores 416 the public key A, for example, in a data storage device or a cryptography module. In an embodiment, the public key A is digitally signed by an entity that is mutually trusted by the authorization service 402 and the extension service 404—in an embodiment, the authorization service and the extension service are services of a computing resource service provider that has a component that generates digital signatures that are trusted by the services of the computing resource service provider.

In an embodiment, the client sends 418 a request to the extension service 404 to establish secure communications. In an embodiment, extension service receives the request after it stores the public key in step 416, but such need not be the case—in an embodiment, the extension service receives a request and sends a second request to the authorization service requesting a public key that is usable to communicate with the client.

In an embodiment, the extension service receives the request and generates 420 an asymmetric key pair having an asymmetric private key b and a corresponding public key B. In an embodiment, the private key b is selected randomly or pseudo-randomly and the generator g is used to compute the public key B:

$$B=g^b \bmod p$$

where g is an element of a finite cyclic group G of order n, a is the corresponding private key value, and p is the prime where g is a primitive root modulo p. In an embodiment, a set of parameters (g, G, n, p) are made available.

The private key b and the public key A, in an embodiment, are used to calculate 422 a session secret SK that is used for session communications:

$$SK=A^b \bmod p=(g^a)^b \bmod p$$

where g is an element of a finite cyclic group G of order n and p is a prime where g is a primitive root modulo p. In an embodiment, the session secret SK is a cryptographic key.

In an embodiment, techniques to generate 424 an encryption key and/or authentication key are in accordance with techniques described elsewhere in this disclosure, such as in connection with FIG. 3. In an embodiment, a response to a request is encrypted and an authentication tag is generated 426 in association with the response, the authentication tag sufficient to determine whether a purported message is authentic. In an embodiment, an encrypted message, a MAC tag, and the public key B are sent to the client 406.

In an embodiment, the client receives an encrypted message, a MAC tag, and a public key B from the extension service and calculates 428 an asymmetric key pair having an asymmetric private key b and a corresponding public key B. In an embodiment, the private key a and the public key B are used to calculate 428 the session key SK:

$$SK = B^a \bmod p = (g^b)^a \bmod p$$

where g is an element of a finite cyclic group G of order n, a is the corresponding private key value, and p is the prime where g is a primitive root modulo p. In an embodiment, a set of parameters (g, G, n, p) are made available. It should be noted that the values computed by the client 406 and the extension service 404 are the same. Accordingly, once the session key SK is computed, the system can generate the encryption and/or authentication keys (e.g., using the techniques described above in connection with step 424) and then decrypt and authenticate 430 the data received such as decrypting the encrypted message and verifying authenticity of the MAC tag.

Figure 5:
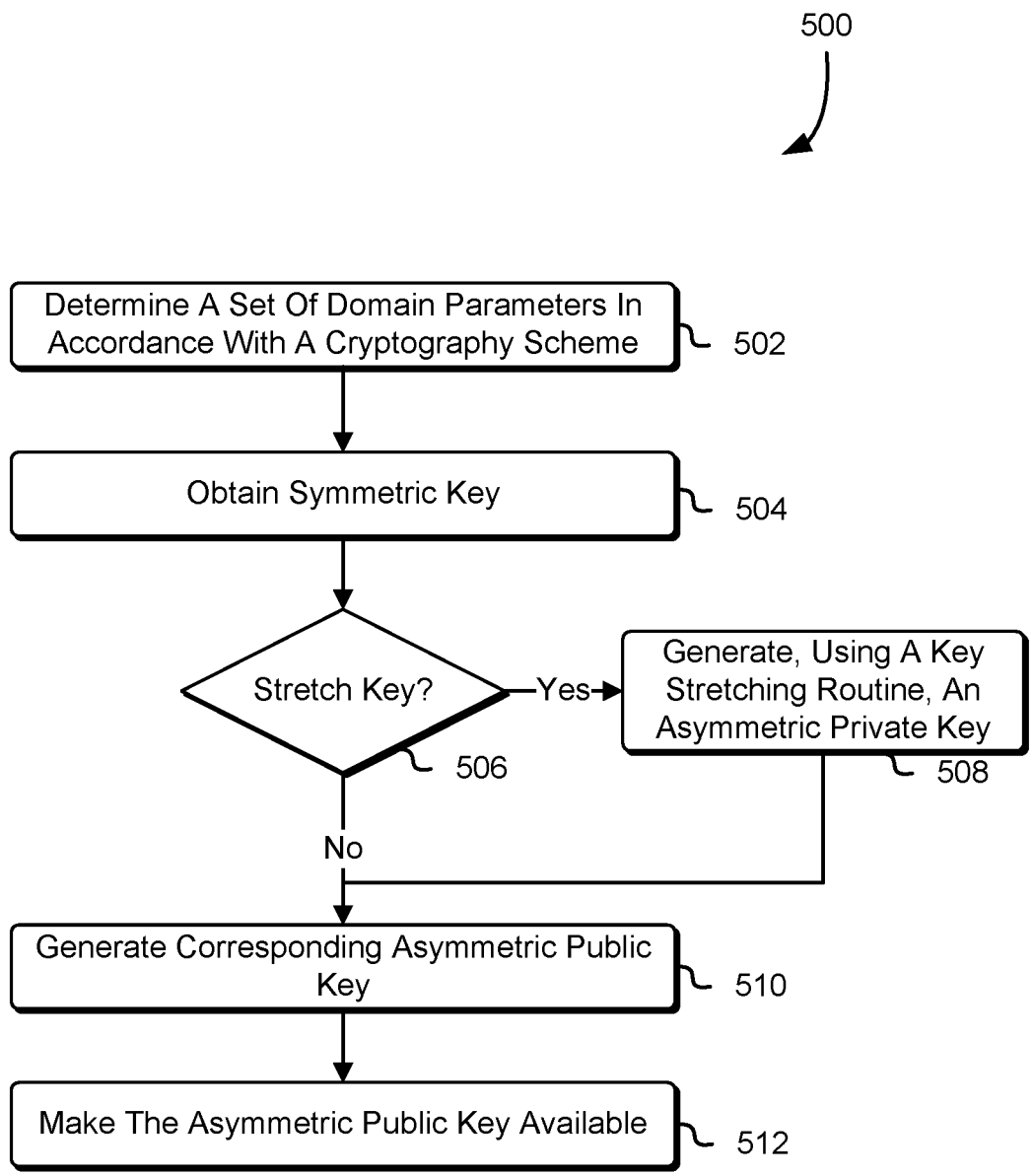
FIG. 5 illustrates a diagram of a system for generating an asymmetric public key that enables a third party to use a shared secret without revealing the secret to the shared party, in accordance with one embodiment.

In an embodiment, techniques such as those described in connection with FIGS. 4 and 5 are utilized in the context of a communication between a first computing system and a second computing system wherein the second computing system comprises two or more subsystems having different access rights. In an embodiment, the first computer system is a service of a computing resource service provider with access to an access key, and the second computer system comprises a first subsystem that has access rights sufficient to use the access key and a second subsystem lacking sufficient access rights to use the access key. In an embodiment, the first subsystem comprises an enclave that has access to the access key via its respective enclave memory address space and the second subsystem comprises applications and/or processors outside of the enclave. In an embodiment, the first computer system (e.g., a service of a computing resource service provider) generates a public key and transmits the public key to the second computer system. In an embodiment, the public key is received by the second computer system and routed to the second subsystem of the second computer system. In an embodiment, the second subsystem of the second computer system has access to the public key and lacks access to (and lacks the ability to access) the access key as described above. In an embodiment, the second subsystem generates an asymmetric key pair and calculates a session secret using the received public key and the private key of the asymmetric key pair. In an embodiment, public key of the asymmetric key pair generated by the second subsystem is transmitted to the first computer system, and the first computer system is also able to generate the session secret using the access key and the public key of the asymmetric key pair that was received from the second subsystem.

In an embodiment, a service of a computing resource service provider is used to provide various services to a client computer system, such as storing data uploaded to the service by the client computer system. In an embodiment, the service and a process running in a protected execution environment (e.g., an enclave as described below) of the client computer system both have access to an access key. In an embodiment, the service (or a computing entity on behalf of the service) derives a first public key from the session secret using any suitable technique such as those described in connection with FIGS. 3 and 4. In an embodiment the first public key is transmitted (e.g., by the service) to the client computer system and made available to a process of the client computer system running outside of the protected execution environment (hereinafter referred to as the "unprotected process")—although such a process is referred to as an unprotected process, the process is only unprotected insofar as it is excluded from the protected execution environment that has access to the access key and, in an embodiment, comprises a privileged processes such as a virtualization monitor, a basic input/output system, operating systems, another protected execution environment (e.g., another enclave), and any combination thereof. In an embodiment, the first public key is provided to the unprotected process in association with instructions to upload data content (e.g., a network location, security token, or other information that may be used to determine how and/or where to upload the data). The unprotected process, in an embodiment, generates an asymmetric key pair comprising a second private key and a second public key. The second public key is generated based at least in part on the second private key, in an embodiment, such as in the manner described in connection with FIG. 2. In an embodiment, a session secret is generated by the unprotected process using the second private key and the first public key. In an embodiment, the second public key is transmitted to the service and the session secret is a premaster secret in accordance with a TLS handshake protocol. In an embodiment, the session secret is utilized to establish a cryptographically protected communications session wherein the unprotected process encrypts data, uploads the data in an encrypted format, and the server receives the data and utilizes the session secret to decrypt the encrypted data.

An enclave, in an embodiment, is a protected area in memory address space of a computer system that provides confidentiality and integrity for processes (e.g., applications) and data within the protected area. In an embodiment, an enclave operates as a protected execution environment that prevents processes external to the enclave, even privileged processes (e.g., applications) such as virtualization monitors, basic input/output systems, operating systems, and even other enclaves, from accessing the enclave memory address space, but processes (e.g., applications) executing within the enclave may access executable instructions and data internal to the enclave. In an embodiment, an enclave prevents access to unencrypted enclave data (i.e., data resident within the enclave) by processes (e.g., applications) external to the enclave, and when the data is written to the memory address space, the data is automatically encrypted. Additionally, information exiting the enclave is, in an embodiment, cleansed of data referring to the enclave's protected memory addresses to prevent external software from determining the location of enclave-protected data in memory.

Enclave functionality, in an embodiment, is provided to a system through software, such as under the control of a hypervisor or a kernel of an operating system that allows virtualized user space instances, or through hardware by a specialized instruction set, such as Intel® Software Guard eXtensions (SGX), a module such as a trusted platform module (TPM), system microcode or combinations of these. In an embodiment, enclave functionality allows programmatic instantiation of an enclave and comprises initializing of an enclave control structure, allocating enclave memory, loading of enclave contents (e.g., processes and/or data loaded into the enclave) into the enclave memory, measuring of the enclave contents, and establishing an enclave identity. Enclave functionality may also include the ability to protect processes (e.g., applications) and/or data within the enclave from malicious software attacks, by detecting integrity violations of protected processes (e.g., applications) and/or data and preventing access to protected processes (e.g., applications) and/or data that fail integrity checks.

FIG. 5 shows an illustrative example of a process that, as a result of being performed by a suitable system, implements generating an asymmetric public key that enables a third party to use a shared secret without revealing the secret to the shared party, in accordance with at least one embodiment. The process illustrated in the flowchart 500 may, generally speaking, be performed by any suitable computing entity such as by a service of a computing resource service provider. In an embodiment, the process illustrated in FIG. 5 is performed in accordance with system described in connection with FIGS. 1-4, such as an authorization service.

In an embodiment, the system that implements the process illustrated in the flowchart 500 includes executable code that, if executed by one or more processors of the system, causes the system to determine 502 a set of domain parameters in accordance with a cryptography scheme. In an embodiment, the domain parameters are defined in accordance with a protocol, such as an Elliptic Curve Diffie-Hellman key exchange protocol. In an embodiment, the parameters are defined in accordance with a Diffie-Hellman key exchange protocol. Examples of domain parameters are discussed elsewhere in this disclosure, such as in connection with FIGS. 3 and 4. In an embodiment, the domain parameters are agreed upon by the system and another system, such as an agreement between the authorization service and a client of the service. In an embodiment, the parameters are defined in accordance with industry and/or government standards.

In an embodiment, the system obtains 504 a symmetric key that is a secret shared between the system and another system (e.g., a client of the service). In an embodiment, the symmetric key is used and/or usable to perform various operations related to cryptographically protecting communications between two or more parties. For example, the symmetric key is, in an embodiment, an access key that is used to encrypt and decrypt data transmitted between two parties, such as the authorization service and client as described elsewhere.

In an embodiment, the system determines whether 506 to stretch the symmetric key based on various factors, such as the length of the symmetric key, the type of asymmetric public key being generated (e.g., based on the cryptography algorithm) and more. If the system determines the key should be stretched, the system generates 508 a derived key using any suitable key stretching or key derivation routine, such as Password-Based Key Derivation Function 2 (PBKDF2). In an embodiment, the system determines a desired key length for the asymmetric private key and performs the key stretching or key derivation routine to obtain an asymmetric private key of the desired length. However, if the system determines that the symmetric key does not need to be stretched, then the symmetric key or a value derived thereof, in an embodiment, is used as the asymmetric private key.

In an embodiment, the system generates 510 a corresponding asymmetric public key from the asymmetric private key, such as by using techniques described elsewhere in this disclosure, such techniques described in connection with FIG. 4. For example, elliptic curve point multiplication is used to compute the public key value using a base point G in accordance with one embodiment; in an embodiment, a generator g is used in conjunction with a private key value to compute the asymmetric public key.

In an embodiment, the system makes the asymmetric public key available 512 to a micro-service or extension service. In an embodiment, the asymmetric public key is provided to a micro-service as part of the creation and/or initialization of the service, for example, to perform a specific task or series of tasks.

Figure 6:
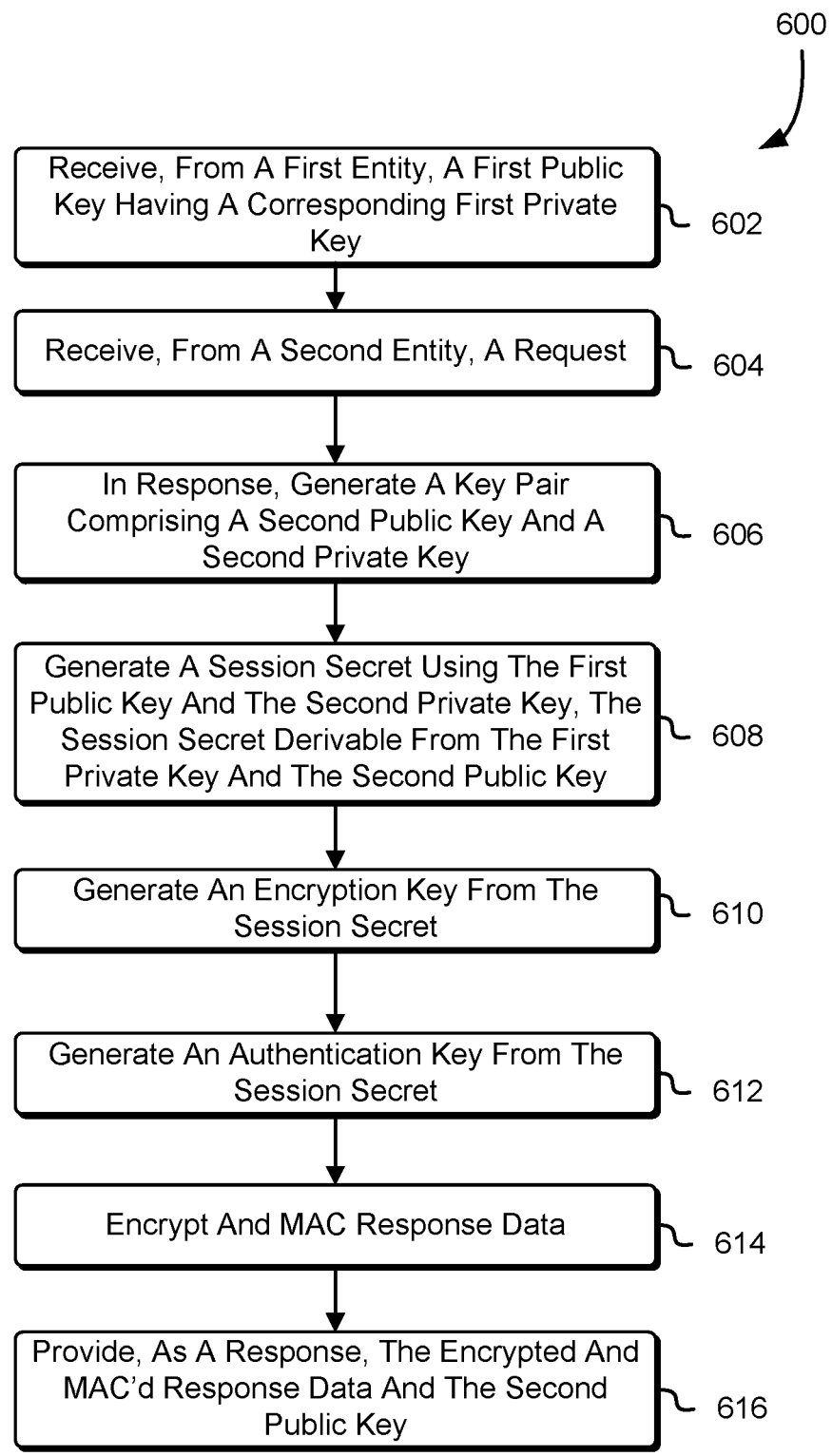
FIG. 6 illustrates a diagram of a system for implementing a mechanism to allow the system to use a secret shared between two parties without revealing the secret to the system, in accordance with one embodiment.

FIG. 6 shows an illustrative example of a process that, as a result of being performed by a suitable system, implements a mechanism to allow the system to use a secret shared between two parties without revealing the secret to the system, in accordance with at least one embodiment. The process illustrated in the flowchart 600 may, generally speaking, be performed by any suitable computing entity such as by a service of a computing resource service provider. In an embodiment, the process illustrated in FIG. 6 is performed in accordance with system described in connection with FIGS. 1-4, such as an extension service.

In an embodiment, the system that implements the process illustrated in the flowchart 600 includes executable code that, if executed by one or more processors of the system, causes the system to use a secret shared between two parties without the secret being revealing to the system.

In an embodiment, the system receives 602, from a first service or entity, a first asymmetric public key of a first asymmetric key pair having a corresponding first private key. In an embodiment, the first private key is a secret shared between two entities and is not, and should not, be shared with the system that implements the process illustrated in the flowchart 600. In an embodiment, the system stores the first public key using a data storage center or a cryptography module such as a hardware security module. In an embodiment, the system receives 604, from a second service, a request and the system, in response to the request, generates 606 a key pair comprising a second public key and a second private key. In an embodiment, the extension service does not reveal the second private key to other entities and stores the second private key in a cryptography module. In an embodiment, the system generates 608 a session key using the first public key and the second private key, wherein the session secret is derivable from the first private key and the second public key. In an embodiment, the session secret can be derived by various entities using techniques such as those described in connection with FIG. 2. In an embodiment, the system generates 610 an encryption key from the session secret and generates 612 an authentication key from the session secret using techniques described elsewhere, such as those discussed in connection with FIG. 2. As noted elsewhere, the ordering of such operations as illustrated in the flowchart 600 are non-limiting illustrative examples—in an embodiment, the authentication key is generated before, concurrently, or in a nondeterministic manner as compared with the generation of the encryption key.

In an embodiment, the system performs 614 encryption and authorization operations on response data that is to be sent in response to the request as described above. In an embodiment, the system encrypts the response data and generates an authentication tag based at least in part on the response data—for example, using techniques described above in connection with FIG. 2. In an embodiment, the system provides 616, as a response, the encrypted response data, an authentication tag that provides cryptographically verifiable assurance of integrity and authenticity of the encrypted response, and the second public key. In an embodiment, the system makes the aforementioned data available directly (e.g., encoded in a message that has an intended recipient as the initial requestor) or indirectly (e.g., the data is stored in a location and a reference to the location, such as a URI, is provided in a message directed to the requestor).

Figure 7:
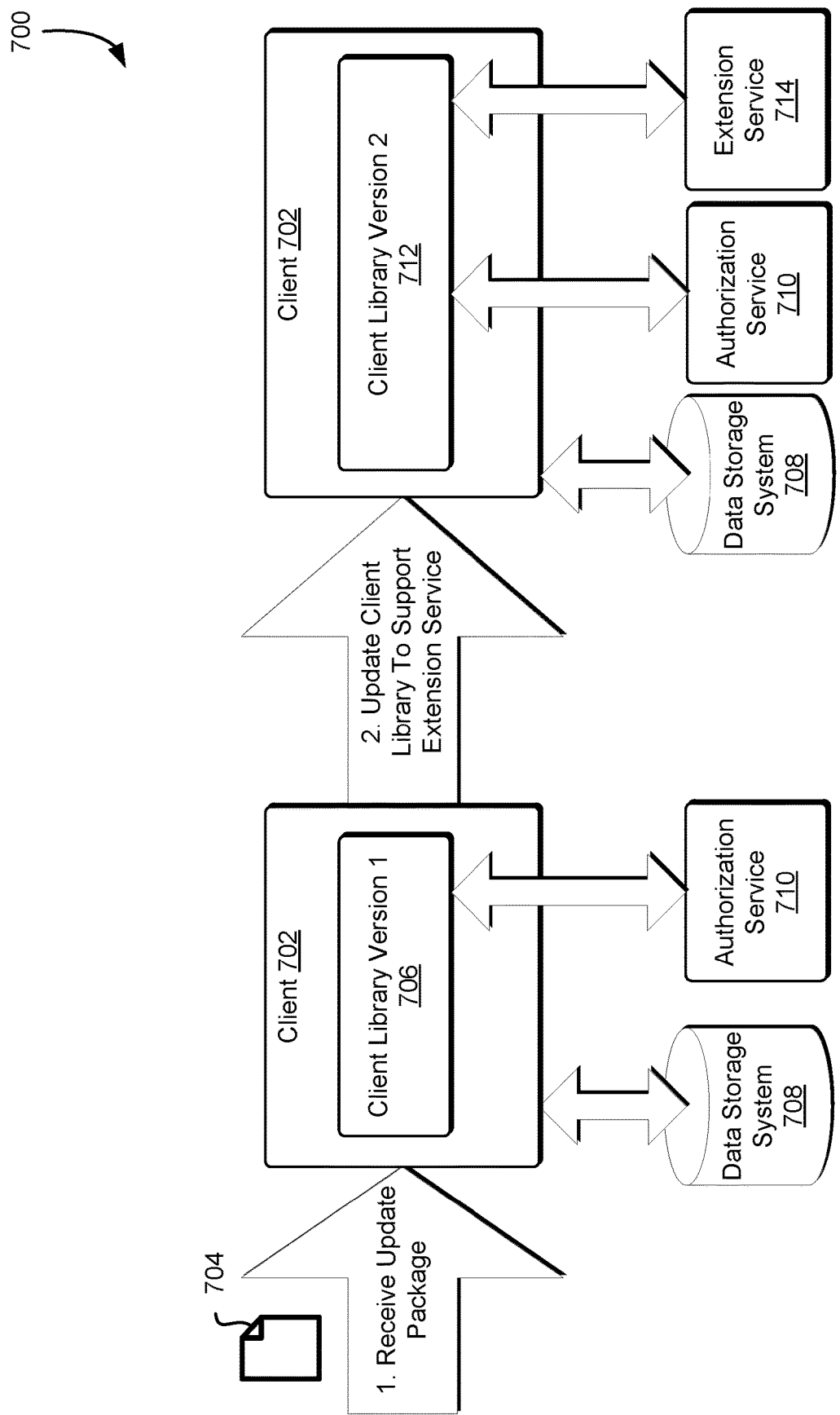
FIG. 7 illustrates a diagram of a client library update, in accordance with one embodiment.

FIG. 7 illustrates a diagram 700 diagram of a client library that is updated to support an extension service, in accordance with one embodiment. In an embodiment, a client 702 is a computer system that includes a client library (e.g., the client 702, prior to an upgrade, has a first version of the client library 706) and has access to a data storage system 708. In an embodiment, various versions of the client library support communicating with an authorization service 710. In an embodiment, the client 702 and authorization service 710 use a symmetric access key to implement various functionality where the data storage system 708 is provisioned to store the access key on behalf of the client 702. In an embodiment, the access key is used to ensure the confidentiality and integrity of data transmitted between the client (e.g., via the client library) and the authorization service 710. In an embodiment, various components described in connection with FIG. 7 are implemented in accordance with embodiments described elsewhere in this disclosure, such as embodiments described in connection with FIG. 1.

In an embodiment, the client 702 receives an update package 704 that includes code for updating the client library 706—for example, the update package 704, in an embodiment, includes executable code and resources that are used to upgrade the client library to support additional functionality, such as supporting communications with an extension service 714 that supports a set of APIs. In an embodiment, a component of the client 702 such as the operating system or an application detects that a new version of the client library is available and prompts a user of the client 702 with a query for whether to download the update. In an embodiment, update package 704 is downloaded automatically, either when a new version is detected and/or on a periodic schedule.

In an embodiment, a client library is updated by modifying and/or replacing executable code such as replacing an old version of a DLL with a newer version of the DLL. In an embodiment, a first version of the client library 706 does not support an extension service 714 (e.g., the client is unable to communicate with the extension service under the same cryptographically verifiable assurances of confidentiality and/or integrity that is supported for communications between the client and the authorization service) and a second version of the client library 712 is configured with executable code that supports the extension service 714 by using mechanisms described herein to allow the extension service to use the access key that is a secret shared between the client and authorization service without revealing the secret to the extension service. In an embodiment, the newer version of the client library 712 includes executable code that, if executed, implements various aspects of processes described in connection with FIGS. 5 and 6. It should be noted that, in accordance with one embodiment, updating the client library in this manner enables support for the extension service 714 without the need to re-provisioned the data storage system 708 to store additional cryptographic material such as a public key associated with the extension service 714. In an embodiment, a process for enabling support for extension services without the need to re-provisioning a client to store additional cryptographic material is beneficial because clients have limited resources for storing cryptographic material and clients can support a larger number of extension services (e.g., a first extension service for providing a first set of additional functionality, a second extension service for providing a different set of functionality, and so on) without increasing the amount of computing resources needed to support a multitude of extension services.

It should be noted that the phrase "one-way function" includes functions that are not necessarily one-way in the strict mathematical sense, but rather, in an embodiment, exhibits properties (such as collision resistance, preimage resistance and second preimage resistance) that render the function useful in contexts in which the various techniques of the present disclosure are applied. In an embodiment, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold), in accordance with at least one embodiment. In an embodiment, the exact threshold for each probability is context-dependent, with lower probabilities corresponding to higher security contexts. One-way functions include, in an embodiment, cryptographic functions that accept at least a plaintext and a cryptographic key as inputs and generate at least a ciphertext as an output (e.g., an encryption function). In an embodiment, the output is such that an entity with the output of the cryptographic operation is unable, without access to particular secret information, determine the input without performing an extraordinary expenditure of computing resources. For example, a one-way function, in accordance with at least one embodiment, includes an RSA encryption function such that the RSA encryption function accepts as inputs a plaintext and a public key and generates a ciphertext output that an entity without the corresponding private key is unable to solve in a feasible manner. While the input may be determinable to an entity without the private key through performing an integer factorization (e.g., a prime factorization), no known algorithm exists to solve the integer factorization problem in polynomial time using conventional computer systems. In an embodiment, a one-way function is used to perform a cryptographic derivation such that an input to the one-way function is used to cryptographically derive an output in a manner that an entity without access to the corresponding input is not able to determine the input without extraordinary expenditure of computational resources. In an embodiment, an extraordinary expenditure of computational resources refers to using computational resources to perform a computation whose run time complexity is not known to have an upper bound that can be represented by a polynomial expression.

Figure 8:
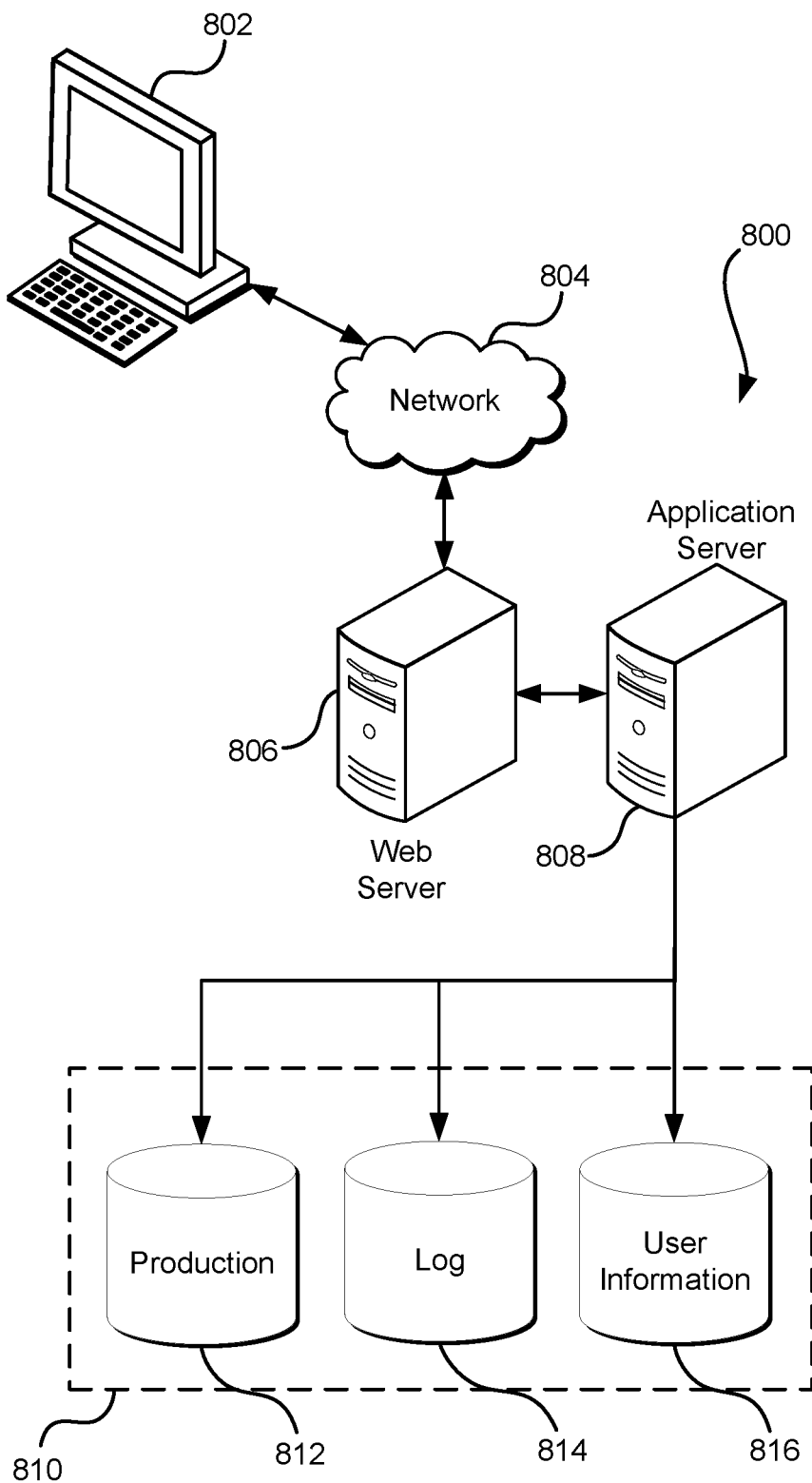
FIG. 8 illustrates a system in which various embodiments can be implemented, in accordance with one embodiment.

FIG. 8 illustrates aspects of an example system 800 for implementing aspects in accordance with various embodiments. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices or virtual computer systems and refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. The application server can include any appropriate hardware, software and firmware for integrating with the data store as needed to execute aspects of one or more applications for the client device, handling some or all of the data access and business logic for an application. In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, analysis or other such purposes. In an embodiment, other aspects such as page image information and access rights information are stored in the data store in any of the above listed mechanisms as appropriate or in additional mechanisms in the data store 810. The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content.

In an embodiment, each server typically includes an operating system that provides executable program instructions for the general administration and operation of that server and includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular, wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   at a second service launched by a first service to implement an extension of an application programming interface (API):

obtaining a first public key from the first service, wherein the first public key is derivable from a corresponding first private key that is shared between the first service and a client computer system and that is inaccessible to the second service;

obtaining, from the client computer system, a request in accordance with the extension of the API;

generating a key pair comprising a second public key and a second private key;

computing a value for a session key based at least in part on the first public key and the second private key, wherein the value can also be computed from the first private key and the second public key; and transmitting, to the client computer system, an encrypted response to the request and the second public key, wherein the encrypted response is decryptable using the session key.

2. The computer-implemented method of claim 1, further comprising:

deriving a third key based at least in part on the first public key and a second private key;

deriving an encryption key using at least the third key; and encrypting a response, thereby producing the encrypted response.

3. The computer-implemented method of claim 1, further comprising using a key derivation function to derive the second public key from the second private key.

4. The computer-implemented method of claim 1, wherein the key pair generated is in accordance with a Diffie-Hellman key exchange protocol.

5. A system, comprising one or more non-transitory computer-readable storage media storing a set of instructions, which as a result of execution by one or more processors, cause the system to at least:

obtain a first public key from a service, Wherein the first public key is derivable from a corresponding first private key that is shared between the service and a client computer system and that is inaccessible to the system, wherein the system is launched by the service to implement an extension of an application programming interface (API);

obtain, from the client computer system, a request in accordance with the extension of the API;

generate a key pair comprising a second public key and a second private key;

compute a value for a session key based at least in part on the first public key and the second private key, wherein the value can also be computed from the first private key and the second public key; and transmit, to the client computer system, an encrypted response to the request and the second public key, wherein the encrypted response is decryptable using the session key.

6. The system of claim 5, wherein:

the first public key and the first private key form a first Elliptic curve cryptography (ECC) key pair;

the second public key and the second private key form a second Elliptic curve cryptography (ECC) key pair; and the set of instructions to compute the value for the session key, which as a result of execution by one or more processors, further include instructions that cause the system to perform an elliptic curve point multiplication based at least in part on the first public key and the second private key.

7. The system of claim 6, wherein at least one of the first ECC key pair and the second ECC key pair is defined based at least in part on an Elliptic Curve Diffie-Hellman (ECDH) key exchange protocol.

8. The system of claim 5, wherein the set of instructions, which as a result of execution by the one or more processors, further cause the system to:

obtain a set of domain parameters that comprises a generating element, wherein the set of domain parameters is accessible by at least the system, the service, and the client computer system; and determine the second public key based at least in part on the generating element and a second private key corresponding to the second public key.

9. The system of claim 5, wherein the second private key is generated randomly or pseud-randomly.

10. The system of claim 5, wherein the session key is a symmetric key.

11. The system of claim 10, wherein the set of instructions, which as a result of execution by the one or more processors, further cause the system to establish a cryptographically protected communications session with the client computer system using the symmetric key as a session secret of the cryptographically protected communications session.

12. The system of claim 5, wherein the set of instructions, which as a result of execution by the one or more processors, further cause the system to:

derive an authentication key from the session key;

use the authentication key to generate a message authentication code (MAC) tag associated with the encrypted response; and transmit, to the client computer system, the MAC tag.

13. A non-transitory computer-readable storage medium storing executable instructions that, as a result of execution by one or more processors of a computer system, cause the computer system to at least:

obtain a first public key from a service, wherein the first public key is derivable from a corresponding first private key that is shared between the service and a client computer system and that is inaccessible to the computer system, wherein the computer system is launched by the service to implement an extension of an application programming interface (API);

obtain, from the client computer system, a request in accordance with the extension of the API;

generate a key pair comprising a second public key and a second private key;

compute a value for a session key based at least in part on the first public key and the second private key, wherein the value can also be computed from the first private key and the second public key; and transmit, to the client computer system, an encrypted response to the request and the second public key, wherein the encrypted response is decryptable using the session key.

14. The non-transitory computer-readable storage medium of claim 13, wherein the second public key is generated based at least in part on a generator, wherein the generator is available to at least the computer system and the client computer system.

15. The non-transitory computer-readable storage medium of claim 13, wherein the instructions to generate the key pair comprising the second public key and the second private key comprise instructions that, as a result of execution by the one or more processors, cause the computer system to:

generate the second private key; and derive the second public key from at least the second private key using a key derivation function.

16. The non-transitory computer-readable storage medium of claim 15, wherein the key derivation function is a Password-Based Key Derivation Function 2 (PBKDF2) based key derivation function.

17. The non-transitory computer-readable storage medium of claim 13, wherein the instructions that, as a result of execution by the one or more processors, further cause the computer system to:

obtain a set of domain parameters comprising a generating element; and compute the value for the session key based further at least in part the generating element.

18. The non-transitory computer-readable storage medium of claim 13, wherein the instructions that, as a result of execution by the one or more processors, further cause the computer system to:

derive an encryption key from the session key;

encrypt a message using the encryption key, thereby producing the encrypted response; and wherein the encrypted response is decryptable using the session key by at least deriving the encryption key from the session key.

19. The non-transitory computer-readable storage medium of claim 18, wherein the instructions to derive the encryption key from the session key further comprise instructions that, as a result of execution by the one or more processors, cause the computer system to utilize a one-way function to derive the encryption key from the session key.

20. The non-transitory computer-readable storage medium of claim 13, wherein the instructions that, as a result of execution by the one or more processors, further cause the computer system to:

derive an authentication key from the session key;

use the authentication key to generate a message authentication code (MAC) tag associated with the encrypted response; and transmit, to the client computer system, the MAC tag.

\* \* \* \* \*